(12) United States Patent
Mahr

(10) Patent No.: US 6,843,966 B1
(45) Date of Patent: Jan. 18, 2005

(54) APPARATUS FOR POST-TREATING EXHAUST GASES OF AN INTERNAL COMBUSTION ENGINE

(75) Inventor: Bernd Mahr, Plochingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/601,365

(22) PCT Filed: Jul. 23, 1999

(86) PCT No.: PCT/DE99/02265

§ 371 (c)(1),
(2), (4) Date: Nov. 3, 2000

(87) PCT Pub. No.: WO00/32913

PCT Pub. Date: Jun. 8, 2000

(30) Foreign Application Priority Data

Dec. 1, 1998 (DE) .......................................... 198 55 384

(51) Int. Cl.$^7$ ........................... B01D 53/94; F01N 3/20; F02B 37/18
(52) U.S. Cl. ..................... 422/172; 422/177; 422/171
(58) Field of Search ................................. 422/171, 172, 422/177; 60/286, 301

(56) References Cited

U.S. PATENT DOCUMENTS 5,067,320 A    11/1991  Kanesaki ..................... 60/297
5,209,062 A  *  5/1993  Vollenweider ................ 60/280
5,606,856 A  *  3/1997  Linder et al. .................. 60/286
5,943,858 A  *  8/1999  Hofmann et al. ............. 60/303
6,122,909 A  *  9/2000  Murphy et al. ............... 60/286

FOREIGN PATENT DOCUMENTS

| EP | 381236 | * | 8/1990 |
| EP | 0 886 044 | | 12/1998 |
| FR | 2 483 515 A | | 12/1981 |
| JP | 05-115749 | * | 5/1993 |

OTHER PUBLICATIONS

Patent Abstracts of Japan, vol. 016, No. 328 (M–1281), Jul. 7, 1992, & JP 04 094410 A (Toyota Motor Corp.), Mar. 26, 1992 Zusammenfassung.

* cited by examiner

Primary Examiner—Hien Tran
(74) Attorney, Agent, or Firm—Ronald E. Greigg

(57) ABSTRACT

An apparatus for post-treating exhaust gases of an internal combustion engine, in particular a Diesel engine, having a reduction catalytic converter serving to reduce $NO_x$ ingredients of the exhaust gases, to which reduction catalytic converter an exhaust pipe leads, and having a reducing agent supply device and a device that generates a pressure difference in the exhaust gas. In the apparatus, the supply of reducing agent is effected via a bypass line, which carries a portion of the exhaust gases past the device that generates the pressure difference in the exhaust gas. The apparatus can use either ammonia or a water and urea solution, or hydrocarbons of the fuel as well as CO as a reducing agent.

20 Claims, 2 Drawing Sheets

APPARATUS FOR POST-TREATING EXHAUST GASES OF AN INTERNAL COMBUSTION ENGINE

BACKGROUND OF THE INVENTION

The present invention relates to an apparatus for post-treating exhaust gases of an internal combustion engine, having a reduction catalytic converter used to reduce $NO_x$ ingredients of the exhaust gases and having a device that generates a pressure difference in the exhaust gas, in particular but not exclusively for self-igniting internal combustion engines or Diesel engines with an exhaust gas turbocharger.

As limit values for emissions drop steadily, the most varied apparatuses for post-treating exhaust gases of internal combustion engines have been developed in recent years. To achieve a reduction of $NO_x$ ingredients in exhaust gases, reduction catalytic converters have been developed, particularly for Diesel engines; typically these are subdivided into SCR catalytic converters, which have urea metering systems, and storage catalytic converters. The so-called SCR catalytic converters are regenerated by means of a supply of urea and/or ammonia reducing agent, while the so-called storage catalytic converters are regenerated with hydrocarbons of the entrained engine fuel, in so-called rich exhaust gas phases.

These rich exhaust gas phases can indeed be demonstrated internally of the engine in the lower rpm and load range, but at higher rpm and higher torque, metered addition of reducing agents directly into the exhaust system is necessary, and preheating of the reducing agent may be necessary.

German Patent Disclosure DE-A 196 25 447, discloses a device for post-treating exhaust gases of an internal combustion engine in which exhaust gases are enriched with the fuel before reaching a reduction catalytic converter. This enrichment is done via an evaporator device, which thus introduces the liquid reducing agent in preheated and prepared form into the exhaust gas stream.

European Patent Disclosure EP-A 0 381 236, discloses a corresponding system is known, which to remove nitrogen oxides from exhaust gases from a Diesel engine meters in ammonia as a reducing agent. In this last system, a turbocharger is also provided, which lowers the pressure of the exhaust gas. The solution of urea and water is metered in by means of compressed air.

Finally, U.S. Pat. No. 5,067,320, discloses a system which serves to combust exhaust gas particles in a combustion chamber designed for this purpose. The combustion chamber is supplied via two exhaust gas lines, one of which is equipped with a fuel supply in order to furnish a combustible mixture to the combustion chamber, by means of which mixture the exhaust gas particles of the remaining exhaust gas stream can be combusted. This combustion of exhaust gas particles, however, is diametrically opposed to the goal of a catalytic converter, since this poorly controllable combustion of soot particles produces additional nitrogen oxides.

OBJECT OF THE INVENTION

The object of the invention is to refine a generic apparatus, of the kind disclosed for instance the European Patent noted above, from EP-A 0 381 236, for post-treating exhaust gases of an internal combustion engine with a reduction catalytic converter used to reduce $NO_x$ ingredients of the exhaust gases, to which reduction catalytic converter an exhaust pipe leads, and having a reducing agent supply device and a device that generates a pressure difference in the exhaust gas, this refinement being done in such a way that a simple, optimized supply of reducing agent is effected, resulting in a better reduction of $NO_x$ ingredients in exhaust gases.

SUMMARY OF THE INVENTION

In particular, in the attainment of this object according to the invention, a bypass line is provided, which bypasses the device that generates a pressure difference in the exhaust gases. The reducing agent supply device introduces the reducing agent into this bypass line. Thus according to the invention, a dynamic pressure prevailing in the system, for instance upstream of the turbine of an exhaust gas turbocharger, is utilized to prepare the reducing agent and transport it. A certain vaporization and/or mixing of the reducing agent with some of the exhaust gases can already occur in the bypass line, so that at the entrance to the catalytic converter a more-homogeneous mixture of exhaust gas and reducing agent is present. If a urea and water solution is used as the reducing agent, then because of the utilization of the dynamic pressure, no additional compressed-air units are necessary, so that implementation of the invention even in the passenger car field appears possible. When the hydrocarbons entrained in the vehicle are used as a reducing agent, an otherwise necessary preparation by means of glow plugs or other vaporization devices are unnecessary because of the use of a cracking catalytic converter or a very small undersized catalytic converter. The invention thus enables $NO_x$ reduction even at high volumetric flows of exhaust gas, by means of a rich mixture cloud of HC and CO; the system has a compact design, without requiring electrical energy or additional units, while requiring only slight additional fuel consumption.

Advantageously, the bypass line includes a valve which in particular is controllable. Because the bypass line has a valve, the volumetric flow of exhaust gas moved past the device that varies the pressure can be adjusted or controlled, so that depending on engine parameters, optimal operation of the exhaust system can be achieved. Furthermore, various engine types and engine operating modes can be taken into account via the valve.

In order to unite the portion of the exhaust gas that is present in the bypass line and contains the reducing agent with the remainder of the exhaust gas, it is preferable that the bypass line discharges into the exhaust pipe via a ring conduit with bores. This embodiment furnishes a uniform, homogeneous mixing, so that overall, a homogeneous mixture of reducing agent and exhaust gas is present at the entrance to the catalytic converter.

Alternatively, the bypass line can also discharge into the exhaust pipe via a so-called spray tube. In this version, the portion of the exhaust gas that is diverted via the bypass line and that is enriched with the reducing agent is discharged into the remainder of the exhaust gas in the region of maximum flow velocity, so that once again a mixing of reducing agent and exhaust gas takes place.

In a preferred embodiment, the bypass line includes an injection valve for supplying the reducing agent, so that for the most part the reducing agent in the diverted portion of exhaust gas is already in atomized or vaporized form. In this version, it is possible for some of the reducing agent to condense on the wall of the bypass line, but this condensed reducing agent is partly evaporated by the heat of the exhaust gas and then is substantially completely evaporated at the latest upon mixing with the remaining exhaust gas, before entering the catalytic converter.

As an alternative to an injection valve, the bypass line can have a carburetor device for supplying the reducing agent. The function of a carburetor device is substantially equivalent to the injection valve, but a design corresponding to a suction-type jet pump can be especially advantageous, to make a feeding device for the reducing agent unnecessary. In other words, the reducing agent metering is determined via the flow prevailing in the bypass, or in other words in particular via the valve that controls the throughput through the bypass line.

In a preferred embodiment, the bypass line is assigned a further catalytic converter, which in particular can be embodied as a cracking catalytic converter. This additional oxidation catalytic converter should be relatively small and should convert only slight quantities of reducing agent, in particular hydrocarbon. A still further improved cleaning action of the exhaust system can thus be attained.

Finally, it is advantageous if the device that generates the pressure difference makes the work achieved available in some other way, for instance, if it is provided in the form of a turbine of an exhaust gas turbocharger. This has a synergistic effect; that is, in a system with a turbocharger, the dynamic pressure is used for the post-treatment of the exhaust gas, while the pressure of the exhaust gas itself is used to drive a turbocharger.

In summary, it can be stated that with the system according to the invention, a post-treatment of exhaust gases is made possible in a simple and efficient way. A $NO_x$ reduction can be accomplished even at high volumetric flows of exhaust gas, without requiring additional energy and/or such units as pumps, heaters, evaporators, and so forth.

Further advantages and characteristics of the invention will become apparent from the ensuing detailed description of several presently preferred embodiments, in conjunction with the accompanying drawings, in which:

DESCRIPTION OF PREFERRED EMBODIMENTS

Figure 1:
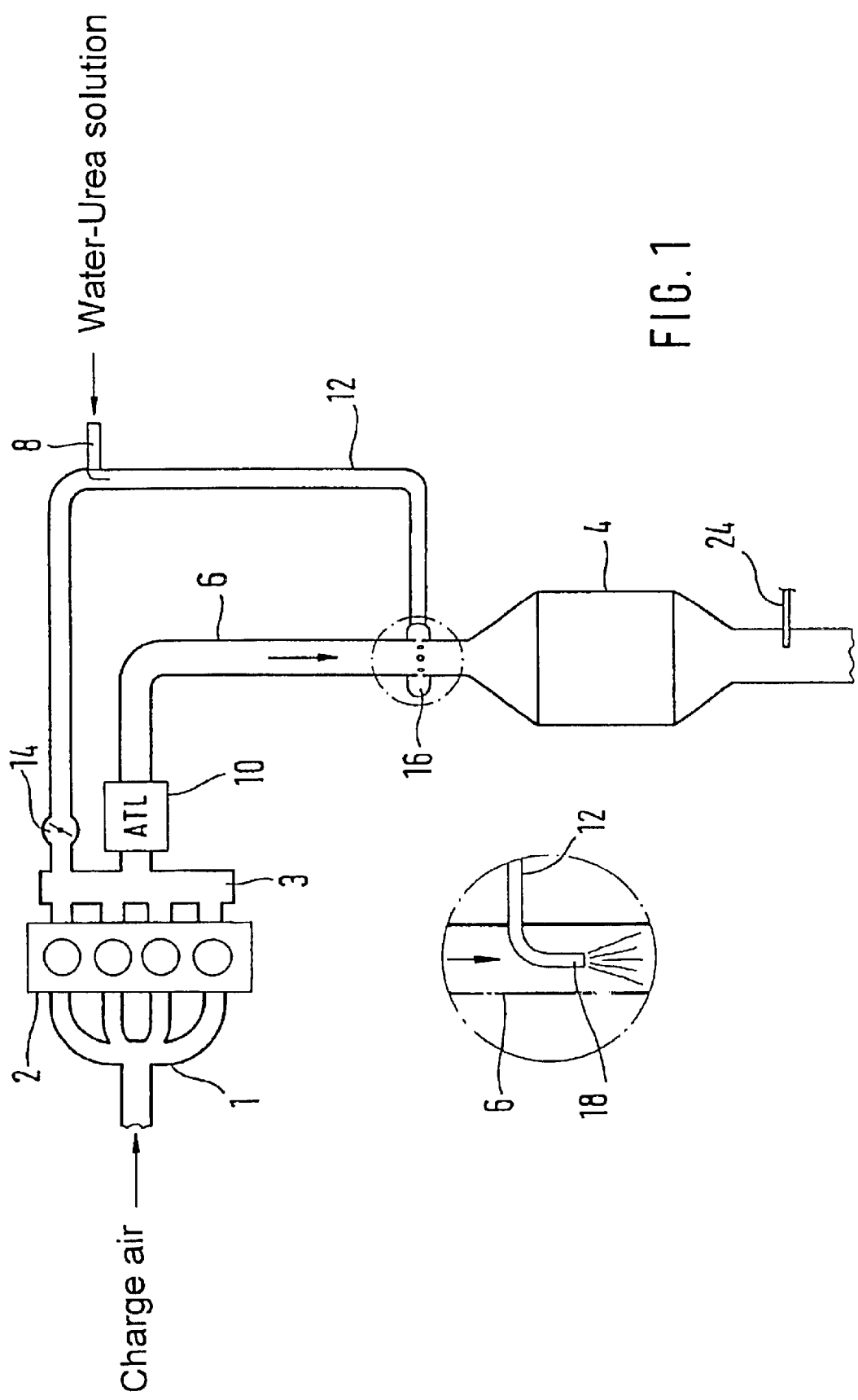
FIG. 1 schematically shows an internal combustion engine with an associated exhaust system, including a preferred embodiment of the apparatus of the invention.

The system shown in FIG. 1 is designed in particular to use a water and urea solution as the reducing agent. In the drawing, an engine 2, has an intake manifold 1 and discharges exhaust gases into an exhaust manifold 3. Downstream of the exhaust manifold 3, there is an exhaust gas turbocharger 10, from which an exhaust pipe 6 leads to a reduction catalytic converter 4. A small portion of the exhaust gases present in the exhaust manifold is delivered to a bypass line 12, via a valve or other closing mechanism 14. Thus what prevails in the bypass line 12 is substantially the dynamic pressure upstream of the turbine of the exhaust gas turbocharger 10. A water and urea solution is delivered to this bypass line, via a reducing agent supply device 8. In the embodiment shown, the reducing agent supply device 8 is provided in the form of an injection valve, so that the water and urea solution is at least partly atomized. The bypass line 12 discharges into the exhaust pipe 6 via a ring conduit 16 with bores, practically immediately upstream of the reduction catalytic converter 4.

As an alternative to the ring conduit with bores, the transition between the bypass line 12 and the exhaust pipe 6 can also be effected by way of a so-called spray tube, as shown in the detailed view. In this version, the end of the d bypass line 12 is disposed substantially in the region of maximum flow velocity in the exhaust pipe, extending substantially parallel to it. Thus what is discharged from the spray tube 18 is a mixture of exhaust gas and water and urea solution, so that an intensive mixing and aerosol formation occurs. As a result, a practically "homogeneous mixture" of exhaust gas and reducing agent is present at the entrance to the reduction catalytic converter 4. Finally, for monitoring the function, an $NO_x$ sensor 24 can also be provided downstream of the catalytic converter 4. The control of the entire system can be effected via the engine controller itself, or via a separate controller that controls the valve 14 and the reducing agent supply device 8. In this control, both engine operating parameters and output data from the $NO_x$ sensor 24 can be employed.

Figure 2:
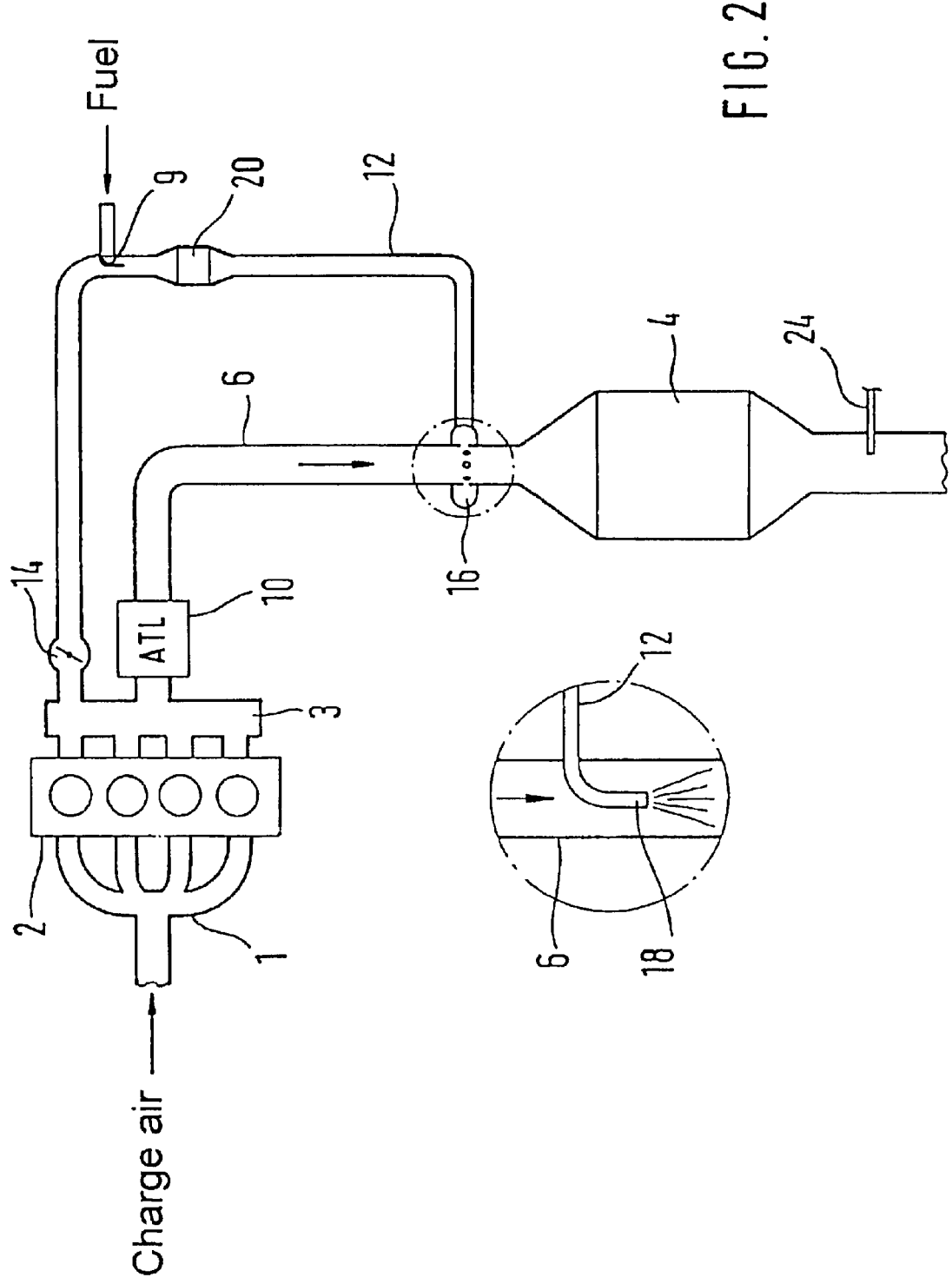
FIG. 2 shows a view similar to FIG. 1, but containing another preferred version of the apparatus of the invention.

In FIG. 2, a system substantially analogous to FIG. 1 is shown, but it is intended in particular for using hydrocarbons or fuel as the reducing agent. As in the embodiment shown in FIG. 1, a portion of the exhaust gases is carried under exhaust gas turbocharger dynamic pressure past the turbine of the exhaust gas turbocharger 10 via a bypass line 12. As in the embodiment of FIG. 1, the reducing agent, in this case fuel and in particular Diesel fuel, is introduced into the bypass line. In contrast to the embodiment shown in FIG. 1, however, a carburetor device 9 is provided, which introduces the reducing agent into the portion of the exhaust gas stream in the bypass line 12. Downstream of the reducing agent delivery 9, a catalytic converter 20 of small size is additionally provided in the embodiment shown in FIG. 2. The catalytic converter 20 in the embodiment shown is a so-called cracking catalytic converter, which acts as an oxidation catalytic converter. This catalytic converter converts slight quantities of hydrocarbon, but the predominant portion of hydrocarbons is evaporated in or downstream of this catalytic converter or converted into carbon monoxide, and is then supplied afterward, upstream of the actual catalytic converter, to the exhaust gas stream for reducing $NO_x$. The reducing agent can preferably be used in the form of rich mixture clouds for reduction in the catalytic converter. As in the embodiment described above, the transition between the bypass line 12 and the exhaust pipe 6 takes place via a ring conduit 16 with bores or alternatively via a spray tube 18.

Although the present invention has been described entirely with reference to preferred embodiments above, one skilled in the art should recognize that the most various modifications are possible and in this sense should be considered to be covered as equivalence by the claims. For example, the device that generates a pressure difference in the exhaust gas can also be a simple throttle, which does use the pressure difference to drive a turbocharger.

By briefly metering in reducing agent, a very rich mixture cloud can be employed for reducing the catalytic converter, and as a result a reduction in the full stream is attained, without exhaust gas valves (as in the case of the storage catalytic converter, for instance).

Advantageously, carbon monoxide directly from a bottle of compressed gas can be used as the reducing agent, without a bypass line.

The foregoing relates to a preferred exemplary embodiments of the invention, it being understood that other variants and embodiments thereof are possible within the spirit and scope of the invention, the latter being defined by the appended claims.

What is claimed is:

1. An apparatus for post-treating exhaust gases of an internal combustion engine (2), comprising a reduction catalytic converter (4) which serves to reduce $NO_x$ ingredients of the exhaust gases and to which an exhaust pipe (6) leads, the apparatus being provided with a reducing agent supply device (8) and means (10) which generates a pressure difference in the exhaust gas in the exhaust pipe (6), and further provided with a bypass line (12) that bypasses the means (10) for generating the pressure difference, wherein the reducing agent supply device (8) introduces the reducing agent into the bypass line (12), and in which the means (10) generating the pressure difference in the exhaust pipe (6) is a turbine of an exhaust gas turbocharger.

2. The apparatus of claim 1, in which the bypass line (12) includes a valve (14) which is controllable.

3. The apparatus of claim 1, in which the bypass line (12) discharges into the exhaust pipe (6) via a ring conduit (16) provided with bores.

4. The apparatus of claim 2, in which the bypass line (12) discharges into the exhaust pipe (6) via a ring conduit (16) provided with bores.

5. The apparatus of claim 1, in which the bypass line (12) discharges into the exhaust pipe (6) via a spray tube (18).

6. The apparatus of claim 2, in which the bypass line (12) discharges into the exhaust pipe (6) via a spray tube (18).

7. The apparatus of claim 1, wherein the reducing agent supply device comprises an injection valve (8) for supplying the reducing agent.

8. The apparatus of claim 2, wherein the reducing agent supply device comprises an injection valve (8) for supplying the reducing agent.

9. The apparatus of claim 3, wherein the reducing agent supply device comprises an injection valve (8) for supplying the reducing agent.

10. The apparatus of claim 5, wherein the reducing agent supply device comprises an injection valve (8) for supplying the reducing agent.

11. The apparatus of claim 1, wherein the reducing agent supply device comprises a carburetor device (8) for supplying the reducing agent.

12. The apparatus of claim 2, wherein the reducing agent supply device comprises a carburetor device (8) for supplying the reducing agent.

13. The apparatus of claim 3, wherein the reducing agent supply device comprises a carburetor device (8) for supplying the reducing agent.

14. The apparatus of claim 5, wherein the reducing agent supply device comprises a carburetor device (8) for supplying the reducing agent.

15. The apparatus of claim 1, in which the bypass line (12) includes at least one catalytic converter (20), in particular a cracking catalytic converter (20).

16. The apparatus of claim 2, in which the bypass line (12) includes at least one catalytic converter (20), in particular a cracking catalytic converter (20).

17. The apparatus of claim 3, in which the bypass line (12) includes at least one catalytic converter (20), in particular a cracking catalytic converter (20).

18. The apparatus of claim 5, in which the bypass line (12) includes at least one catalytic converter (20), in particular a cracking catalytic converter (20).

19. The apparatus of claim 1, in which the reducing agent is selected from the group consisting of a urea, ammonia, and a solution of urea and water.

20. The apparatus of claim 1, in which the reducing agent is the fuel of the engine (2), in particular Diesel fuel.

* * * * *